(12) United States Patent
Johnston

(10) Patent No.: US 10,167,146 B2
(45) Date of Patent: Jan. 1, 2019

(54) CONTAINERIZED TRANSPORTATION TRAILERS

(71) Applicant: Amazon Technologies, Inc., Seattle, WA (US)

(72) Inventor: Simon Kurt Johnston, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 655 days.

(21) Appl. No.: 14/623,330

(22) Filed: Feb. 16, 2015

(65) Prior Publication Data

US 2016/0318721 A1    Nov. 3, 2016

(51) Int. Cl.
| | |
|---|---|
| *B65G 67/20* | (2006.01) |
| *B65G 63/02* | (2006.01) |
| *B65D 88/12* | (2006.01) |
| *B65D 90/00* | (2006.01) |
| *B65G 63/00* | (2006.01) |
| *B65G 65/08* | (2006.01) |
| *B65G 67/24* | (2006.01) |

(52) U.S. Cl.
CPC ......... *B65G 63/025* (2013.01); *B65D 88/127* (2013.01); *B65D 90/0073* (2013.01); *B65G 63/004* (2013.01); *B65G 65/08* (2013.01); *B65G 67/20* (2013.01); *B65G 67/24* (2013.01); *B65D 2203/10* (2013.01); *B65G 2201/025* (2013.01); *B65G 2811/0678* (2013.01); *B65G 2814/0311* (2013.01)

(58) Field of Classification Search
CPC .............................. B65D 88/127; B65G 67/20
See application file for complete search history.

(56) References Cited

U.S. PATENT DOCUMENTS

| | | | | |
|---|---|---|---|---|
| 6,247,747 | B1 * | 6/2001 | Kawanomoto | B60J 5/0498 296/181.3 |
| 6,299,008 | B1 * | 10/2001 | Payne | B65D 88/121 220/1.5 |
| 7,185,779 | B2 * | 3/2007 | Payne | B65D 88/121 220/1.5 |
| 8,079,791 | B2 * | 12/2011 | Ness | B65D 88/123 410/31 |
| 2004/0135668 | A1 * | 7/2004 | Hoffer | E05B 39/00 340/5.2 |
| 2011/0303661 | A1 * | 12/2011 | Tujague, Sr. | B65D 88/526 220/23.88 |
| 2012/0041900 | A1 * | 2/2012 | Moreno | A01K 1/0058 705/500 |
| 2012/0297807 | A1 * | 11/2012 | Canney | H05K 7/1497 62/228.4 |

* cited by examiner

*Primary Examiner* — Jonathan Snelting
(74) *Attorney, Agent, or Firm* — Thomas | Horstemeyer, LLP

(57) ABSTRACT

Disclosed are various embodiments for a containerized shipping trailer and an automated module moving apparatus. A containerized shipping trailer may comprise a shipping container having a plurality of compartments configured to store a plurality of modules in an interior of the shipping container. An automated module moving apparatus may comprise a body configured to move horizontally along a rail from a first position to a second position to insert at least one projection into a portal of a module located in a compartment of the shipping container. The module may be removed and placed at a predefined location.

9 Claims, 8 Drawing Sheets

CONTAINERIZED TRANSPORTATION TRAILERS

BACKGROUND

A trailer is a multi-wheeled vehicle traditionally towed by a powered vehicle, such as a truck or a semi-trailer vehicle. Trailers are commonly employed to transport various items such as electronic goods, food products, raw materials, etc.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
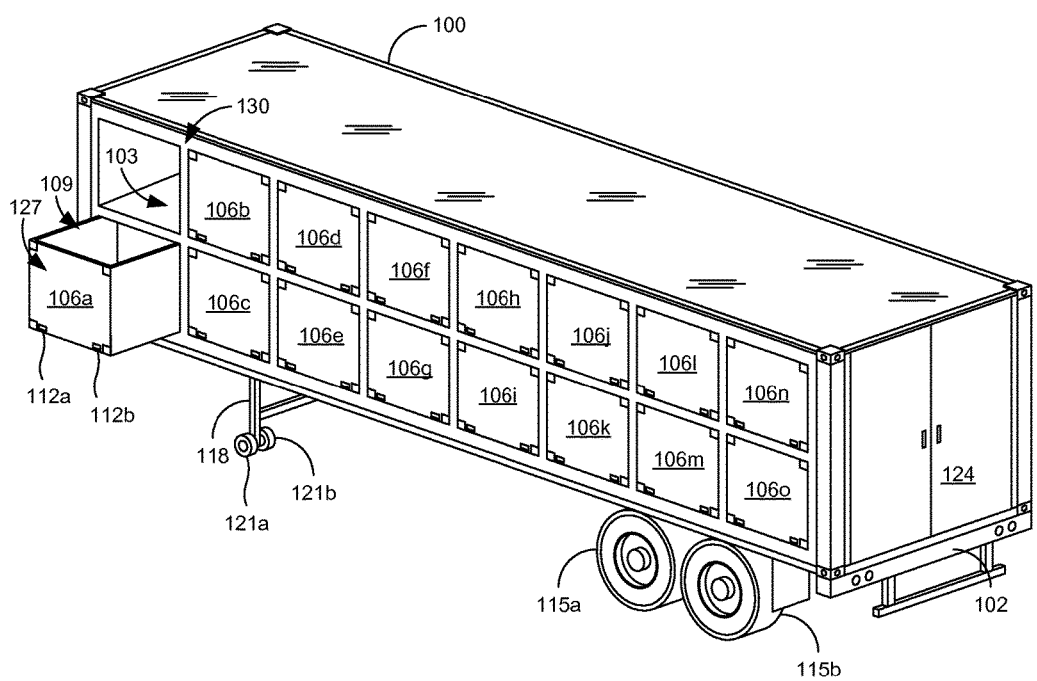
FIG. 1 is a drawing of a containerized shipping trailer according to various embodiments of the present disclosure.

The present disclosure relates to a containerized transportation trailer for efficient loading and unloading operations. A trailer is a multi-wheeled vehicle traditionally towed by a powered vehicle, such as a truck or a semi-trailer vehicle. Trailers are commonly employed to transport various items in shipping containers such as electronic goods, food products, raw materials, etc. Traditionally, items are loaded in a shipping container from the back of the container to the front, frequently described as a last-in-first-out (LIFO) operation. LIFO operations in transportation create increased labor costs and operational expenses, for example, because items must be removed from a front of a shipping container in order to access items stored in the middle or the back of the trailer. Hence, shipping operations are hindered as items at various locations of the trailer are inaccessible without performing unnecessary unload or load operations.

According to various embodiments, a containerized shipping trailer may be employed in the transportation of items. The containerized shipping trailer may include compartments where modules are stored. A module may include a container for storing goods or other items which may be removed independently from the containerized shipping trailer without first requiring a removal of other modules. The compartments may be located along at least one side of the containerized shipping trailer in various configurations of rows and columns. The modules may include electronic identifiers, such as radio-frequency identification (RFID) tags, that may be used for security, tracking, and/or refrigeration.

The modules may be removed from or inserted into compartments using a forklift or a similar device. In some embodiments, the modules may be moved using a module moving apparatus that performs automated removals and insertions of modules into a containerized shipping trailer. As described herein, a module moving apparatus includes a body configured to move horizontally along a rail to position the module moving apparatus at various locations for retrieval and/or insertion operations.

The module moving apparatus includes forks, such as those used on a forklift, which may be inserted into the modules in order to grip, lift, remove, and/or insert modules into the containerized shipper trailer. For example, the module moving apparatus may be configured to move along the rail to a position of a compartment housing a particular module in a containerized shipping trailer. The module moving apparatus inserts the forks into the module to secure the module to the forks. After securing the module, the module moving apparatus removes the module from the compartment and moves the module to a designated location, such as an inventory location in a warehouse or a compartment in another containerized shipping trailer.

In the following discussion, a general description of a containerized shipping trailer, a module moving apparatus, and their components is provided, followed by a discussion of the operation of the same.

With reference to FIG. 1, shown is a non-limiting example of a containerized shipping trailer 100 according to various embodiments of the present disclosure. In the non-limiting example of FIG. 1, the containerized shipping trailer 100 may comprise a shipping container (e.g., an intermodal shipping container) detachably attached to a trailer 102 comprising one or more compartments 103 configured to store one or more modules 106*a* . . . 106*o* (collectively modules 106) at an interior of the containerized shipping trailer 100. As shown in FIG. 1, the one or more compartments 103 may be located longitudinally along at least one side of the containerized shipping trailer 100 in one or more rows and/or columns. At least one side of the modules 106 are exposed on at least one side of the containerized shipping trailer 100. In the non-limiting example of FIG. 1, the containerized shipping trailer 100 comprises eight compartments 103 on a first row and eight compartments 103 on a second row for a total of sixteen compartments 103. As can be appreciated, other configurations of compartments 103 may be employed and there may be varying total numbers and sizes of compartments 103 and/or modules 106.

In various embodiments of the present disclosure, a module 106 may comprise a modal and independently movable container which may be removed from the containerized shipping trailer 100 without requiring a removal of other modules 106. For example, a centrally located one of the modules 106*g* may be removed from the middle of the containerized shipping trailer 100 without first requiring the removal of modules 106 located at the front or back of the containerized shipping trailer 100. In some embodiments, the module 106 may comprise a substantially square-shaped or rectangular-shaped body made up of steel, aluminum, wood, plastic, or any other suitable material. In some embodiments, the module 106 may span a width of the containerized shipping trailer 100 such that one side of the module 106 is exposed on a first side of the containerized shipping trailer 100 and another side of the module 106 is exposed on a second side of the containerized shipping trailer 100. As a result, the module 106 may be removed and/or inserted into the containerized shipping trailer 100 from either side.

In some embodiments, the module 106 may comprise an opening 109 at a top of the module 106; however, in other embodiments, the module 106 may be closed on all sides with a door or removal cover on one or more sides. To facilitate removal or insertion of the module 106 into an interior of the containerized shipping trailer 100, the module 106 may comprise one or more portals 112*a* . . . 112*b* (collectively portals 112) configured to receive one or more projections of a moving device, such as a fork of a forklift or a fork of a module moving apparatus, as will be described below. Although the non-limiting example of FIG. 1 shows the portals 112*a* . . . 112*b* located at a bottom portion of the module 106, in various embodiments, one or more of the portals 112 may be located at different locations of the module 106. For example, the portals 112 may be located in a middle portion or a top portion of the module 106. Further, in some embodiments, the module 106 may comprise a hand grip (not shown) that allows a person to manually remove the module 106 from the containerized shipping trailer 100.

To facilitate movement using a semi-trailer or other suitable vehicle, the containerized shipping trailer 100 may comprise a plurality of wheels 115*a* . . . 115*b* (collectively wheels 115) appropriate for supporting a weight of the containerized shipping trailer 100 as well as its contents. In the non-limiting example of FIG. 1, the containerized shipping trailer 100 comprises a trailer stand 118 that may assist in supporting an end of the containerized shipping trailer 100 when the containerized shipping trailer 100 is not hitched or otherwise attached to a transportation vehicle or structure. In some embodiments, the trailer stand 118 may comprise a plurality of trailer stand wheels 121*a* . . . 121*b* (collectively trailer stand wheels 121). Although shown in FIG. 1 detachably attached to a trailer, in various embodiments, the containerized shipping trailer 100 may be detachably attached to a rail car comprising a plurality of rail wheels for transportation on rail tracks, or may be detachably attached to any other suitable structure or support.

As may be appreciated, in some situations, it may be beneficial for personnel (e.g., truck drivers, warehouse operators, or other personnel) to access an interior of the containerized shipping trailer 100. Accordingly, in some embodiments, the containerized shipping trailer 100 may comprise one or more doors 124 on either end that enable access to an interior of the containerized shipping trailer 100 by personnel.

In various embodiments, the containerized shipping trailer 100 may comprise a length of 28 feet, 48 feet, 53 feet, or any other suitable length. In some embodiments, the containerized shipping trailer 100 may comprise a height of 109 inches, or any other suitable height. In various embodiments, an exposed side 127 of the modules 106 is bounded on all sides by a surface 130 of the side of the containerized shipping trailer 100. For example, a top, a bottom, a left side, and a right side of the exposed side 127 are bounded by the surface 130 of the side of the containerized shipping trailer 100.

Figure 2:
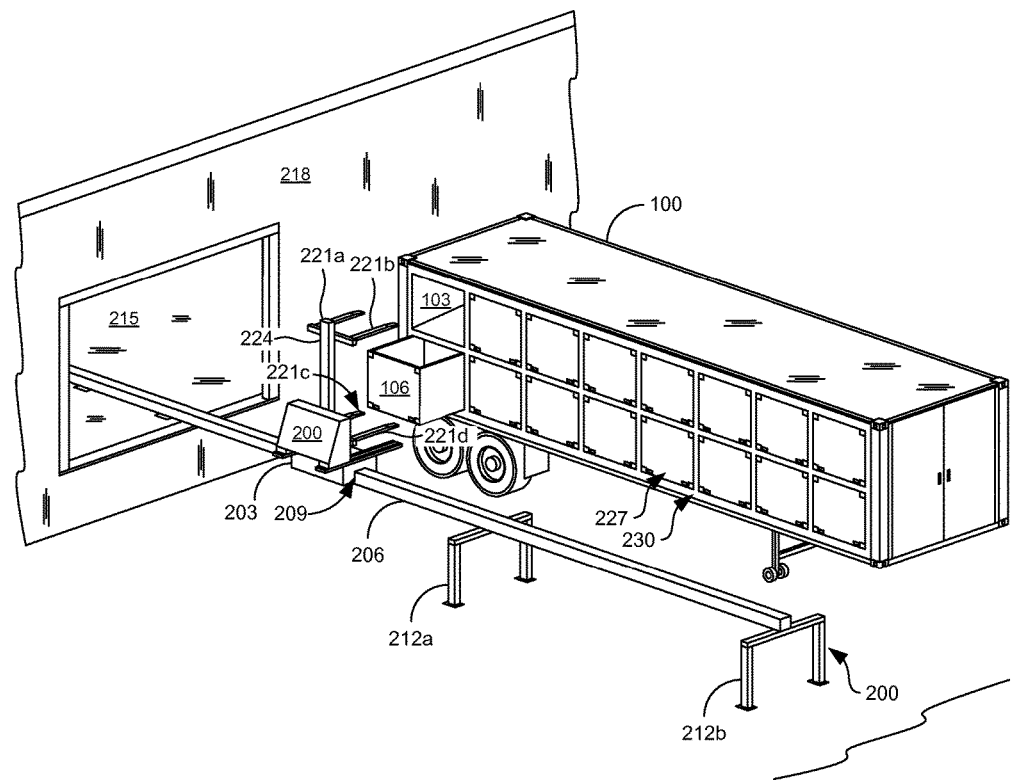
FIG. 2 is a drawing of a module moving apparatus employed in association with the containerized shipping trailer of FIG. 1 according to various embodiments of the present disclosure.

Referring next to FIG. 2, shown is a non-limiting example of a module moving apparatus 200 according to various embodiments of the present disclosure. The module moving apparatus 200 may be employed to perform automated removals and insertions of modules 106 into one or more containerized shipping trailers 100. In the non-limiting example of FIG. 2, the module moving apparatus 200 may comprise a body 203 configured to move horizontally along a rail 206 to position the module moving apparatus 200 at various locations. In various embodiments, the body 203 of the module moving apparatus 200 may comprise one or more actuators, motors, powered cylinders, or other components capable of moving the module moving apparatus 200 horizontally along the rail 206 or about various axes of the rail 206 and/or the body 203 of the module moving apparatus 200. For example, an actuator may be employed to move the module moving apparatus 200 towards or away from a side of a containerized shipping trailer 100. Further, an actuator may be employed to rotate the module moving apparatus by a specified amount, e.g., 90, 180, 270 or 360 degrees. In some embodiments, a motor may be configured to move the body 203 of the module moving apparatus 200 about an axis to flip or rotate a module 106 from one side of the rail 206 to another side of the rail 206.

In some embodiments, the containerized shipping trailer 100 is positioned parallel to the rail 206 such that the module moving apparatus can access the modules 106 on at least one side of the containerized shipping trailer 100. For example, the module moving apparatus 200 may move to a first position to retrieve a module 106 from a compartment 103 of the containerized shipping trailer 100. After retrieving the first module 106, the module moving apparatus 200 may move along the rail 206 to a second position to insert the module 106 into a different compartment 103 of the first containerized shipping trailer 100 or into a compartment 103 of another containerized shipping trailer 100.

To facilitate movement along the rail 206, the body 203 of the module moving apparatus 200 may comprise a guide 209 that closely conforms to the rail 206. Movement of the module moving apparatus 200 along the rail 206 may be employed using pneumatics, hydraulics, electrical motors, combustion engines, and/or other suitable mechanisms. The rail 206 may be supported by one or more rail support structures 212*a* . . . 212*b* (collectively rail support structures 212), which may be detachably attached or secured to the ground for additional rigidity and support. In the non-limiting example of FIG. 2, a portion of the rail 206 extends into an interior 215 of a structure 218, such as a building or a warehouse. As a result, the module moving apparatus 200 may be employed to move modules 106 from the containerized shipping trailer 100 to the interior 215 of the structure 218, and vice versa. At least a portion of the rail 206, or an end of the rail 206, may be detachably attached or secured to the structure 218 for support.

The structure 218 may include, but is not limited to, a materials handing center, a warehouse, residential building, commercial building, distribution center, crossdocking facility, train car, containerized shipping trailer 100, order fulfillment center (also referred to as a fulfillment facility), packaging facility, shipping facility, distribution truck, cargo ship, or other facility or combination of facilities. In various embodiments, the structure 218 may include a mobile crossdock as described in U.S. patent application Ser. No. 14/496,301, entitled "MOBILE CROSSDOCK," filed on Sep. 25, 2014, which is hereby incorporated by reference in its entirety herein.

In various embodiments, the module moving apparatus 200 may comprise one or more projections 221a . . . 221d (collectively projections 221) that may be used to detachably attach modules 106 to the module moving apparatus 200 or to otherwise grip, lift, move, remove, and/or insert modules 106. In various embodiments, the projections 221 may comprise wheels, sliding components or other moving components that facilitate placement of the projections 221 into portals or other receptacles of the modules 106.

As a non-limiting example, the module moving apparatus 200 may be configured to move along the rail 206 to a position corresponding to a compartment 103 of the containerized shipping trailer 100 housing a particular module 106. While in this position, the module moving apparatus 200 may be configured to insert the one or more projections into portals 112 (FIG. 1) of the particular module 106 located in the containerized shipping trailer 100. After securing the module 106, the module moving apparatus 200 may remove the module 106 from the compartment 103 of the containerized shipping trailer 100. In various embodiments, the module moving apparatus may be configured to move the module 106 along the rail 206 to another position, for example, to insert the module 106 into a compartment 103 of another containerized shipping trailer 100, move the module 106 into the interior 215 of the structure 218, or move the module 106 into a different compartment 103 of the containerized shipping trailer 100.

The module moving apparatus 200 of FIG. 2 is shown as having a first set of projections 221a . . . 221b at a first height and a second set of projections 221c . . . 221d located at a second height. As can be appreciated, the first set of projections 221a . . . 221b, extended vertically using a vertical support rail 224, may be used to retrieve and/or insert modules 106 into a compartment 103 at a height above the second set of projections 221a . . . 221b. For example, the first set of projections 221a . . . 221b may be used to retrieve and/or insert modules 106 into compartments 103 on a top row of the containerized shipping trailer 100. The second set of projections 221c . . . 221d may be used to retrieve and/or insert modules 106 into a compartment 103 at a height below the first set of projections 221a . . . 221b. For example, the second set of projections 221c . . . 221d may be used to retrieve and/or insert modules 106 into compartments 103 on a bottom row of the containerized shipping trailer 100. Additionally or alternatively, any of the projections 221 may be configured to move vertically in order to facilitate movement or transfer of modules 106 between compartments 103 at different heights of the containerized shipping trailer 100.

In various embodiments, an exterior-facing portion 227 of a module 106 may be configured such that the exterior-facing portion 227 of the module 106 is flush with an exterior 130 of the containerized shipping trailer 100 housing the module 106. For example, the module 106 may be configured to comprise no additional cover plates, portals 112, or facades to create a smooth, closed surface on the exterior 130 of the containerized shipping trailer 100. In embodiments where the modules 106 comprise one or more portals 112, the one or more of the portals 112 of the modules 106 may be closed, e.g., by hinged, spring-loaded cover plates, thereby creating a smooth surface on the exterior 130 of the containerized shipping trailer 100. In various embodiments, the hinged, spring-loaded cover plates enable access to the portals 112 in response to placement of a predefined amount of force against the cover plates, e.g., by a projection 221, as it is used to insert or retrieve the module 106. As a result, the hinged, spring-loaded cover plates may be employed to access the portals 112 without requiring additional operations or steps to be performed.

Figure 3:
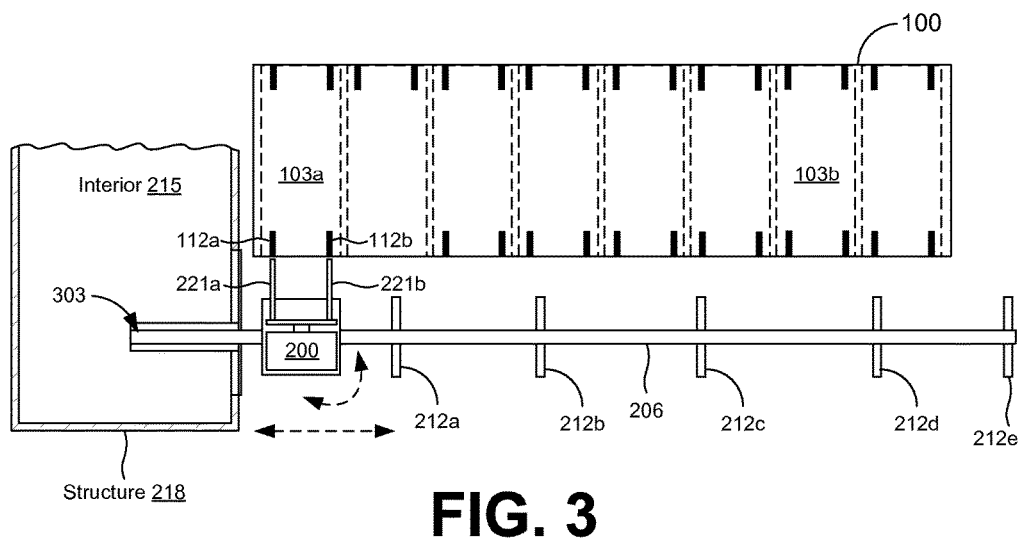
FIG. 3 is a top plan view of the module moving apparatus of FIG. 2 according to various embodiments of the present disclosure.

Turning now to FIG. 3, shown is a top plan view of the module moving apparatus 200 according to various embodiments of the present disclosure. The module moving apparatus 200 may move horizontally along a rail 206 to position the module moving apparatus 200 at various locations. For example, the module moving apparatus 200 may move to a first position to retrieve a module 106 (FIG. 1) from a compartment 103a of the containerized shipping trailer 100. After retrieving the first module 106, the module moving apparatus 200 may move along the rail 206 to a second position to insert the module 106 into a different compartment 103b of the containerized shipping trailer 100 or into a compartment 103 of another containerized shipping trailer 100. In various embodiments, the body 203 of the module moving apparatus 200 may rotate about an axis from a first orientation to a second orientation. For example, the module moving apparatus 200 may be configured to rotate 360 degrees, or any other predefined amount, about an axis of the body 203 of the module moving apparatus 200. As a result, the module moving apparatus 200 may retrieve a module 106 while facing a side of a containerized shipping trailer 100 and rotate 180 degrees, for example, to place the module 106 in a different containerized shipping trailer 100.

In various embodiments, the body 203 of the module moving apparatus 200 may comprise a flat top surface comprising a sliding mechanism (not shown), wherein the projections 221 are configured to slide across the sliding mechanism to access modules 106 from either side of the module moving apparatus 200 and/or to move a module 106 from a first side of the module moving apparatus 200 to a second side of the module moving apparatus 200. For example, the module moving apparatus 200 may retrieve a module 106 from a side of a first containerized shipping trailer 100 and slide the module 106 across the sliding mechanism situated on a top of the body 203 to insert the module 106 into a second containerized shipping trailer 100 located on a different side of the module moving apparatus 200.

As noted above, the rail 206 may be supported by one or more rail support structures 221a . . . 221e. In the non-limiting example of FIG. 3, an end 303 of the rail 206 extends into the interior 215 of the structure 218, which may comprise a materials handling center or a warehouse. As a result, the module moving apparatus 200 may be employed to move modules 106 from the containerized shipping trailer 100 to the interior 215 of the structure 218, and vice versa. In various embodiments, the end 303 of the rail 206 may be detachably attached or secured to the structure 218 for support.

In various embodiments, the module moving apparatus 200 may comprise one or more projections 221a . . . 221b that may be used to detachably attach modules 106 to the module moving apparatus 200. In various embodiments, the projections 221a . . . 221b comprise forks configured to insert into one or more portals 112a . . . 112b of a module 106. In other embodiments, the projections 221a . . . 221b may comprise grippers used to move a module 106 by applying pressure to at least two sides of the module 106. To this end, the module 106 may be gripped, lifted, moved, removed, rotated, and/or inserted into compartments 103 or other locations, such as inventory locations in the structure 218.

As a non-limiting example, the module moving apparatus 200 may be configured to move along the rail 206 to a position corresponding to a compartment 103a of the containerized shipping trailer 100 housing a particular module 106. While in this position, the module moving apparatus 200 may be configured to insert the projections 221a . . . 221b into the portals 112a . . . 112b of the particular module 106 located in the compartment 103a. After securing the module 106 using the projections 221a . . . 221b, the module moving apparatus 200 may remove the module 106 from the compartment 103 of the containerized shipping trailer 100. In various embodiments, the module moving apparatus 200 may be configured to move the module 106 along the rail 206 to another position to insert the module 106 into another compartment 103b of the containerized shipping trailer 100. In other embodiments, the module moving apparatus 200 may be configured to move the module 106 into the interior 215 of the structure 218 or move the module 106 into a compartment 103 of a different containerized shipping trailer 100.

In the non-limiting example of FIG. 3, the compartments 103 are shown extending a width of the containerized shipping trailer 100. As a result, modules 106 stored in the compartments 103 may be configured to extend the width of the containerized shipping trailer 100 such that a first side of a module 106 may be accessed from one side of the containerized shipping trailer 100 and a second side of the module 106 may be accessed from the other side of the containerized shipping trailer 100. In various embodiments, a module moving apparatus 200 may access the modules 106 and/or the compartments 103 from either side of the containerized shipping trailer 100. In some embodiments, the compartments 103 may extend a portion of the width of the containerized shipping trailer 100, and may be removed from only one side of the containerized shipping container 100.

Figure 4:
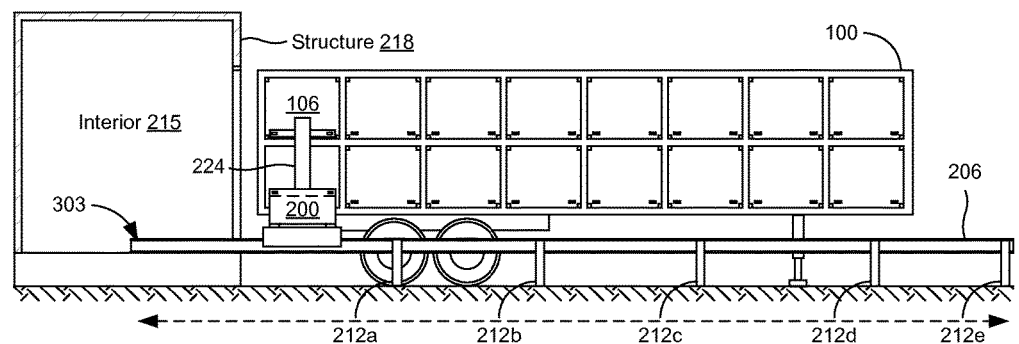
FIG. 4 is a side view of the module moving apparatus of FIG. 2 according to various embodiments of the present disclosure.

Moving on to FIG. 4, shown is a side view of the module moving apparatus 200 according to various embodiments of the present disclosure. As noted above, the module moving apparatus 200 may move horizontally along the rail 206 to position the module moving apparatus 200 at various locations. For example, the module moving apparatus 200 may move to a first position to retrieve a module 106 from a compartment 103 (FIG. 1) of the containerized shipping trailer 100. After retrieving the first module 106, the module moving apparatus 200 may move along the rail 206 to a second position to insert the module 106 into a different compartment 103 of the containerized shipping trailer 100 or into a compartment 103 of another containerized shipping trailer 100.

The rail 206 may be supported by one or more rail support structures 212a . . . 221e. In the non-limiting example of FIG. 4, the end 303 of the rail 206 extends into the interior 215 of the structure 218, which may comprise a materials handling center or a warehouse. As a result, the module moving apparatus 200 may be employed to move modules 106 from the containerized shipping trailer 100 to the interior 215 of the structure 218, and vice versa. In various embodiments, the end 303 of the rail 206 may be detachably attached or secured to the structure 218 for support.

As noted above, the module moving apparatus 200 may comprise one or more projections 221 (FIG. 2) that may be used to detachably attach modules 106 to the module moving apparatus 200. For example, the projections 221 may comprise forks configured to insert into one or more portals 112 (FIG. 1) of a module 106. In other embodiments, the projections 221 may comprise grippers used to move a module 106 by applying pressure to at least two sides of the module 106. To this end, the module 106 may be gripped, lifted, moved, removed, rotated, and/or inserted into compartments 103 or other locations, such as inventory locations in the structure 218.

In an exemplary operation of the module moving apparatus 200, the module moving apparatus 200 may be configured to move along the rail 206 to a position corresponding to a compartment 103 of the containerized shipping trailer 100 housing a particular module 106. While in this position, the module moving apparatus 200 may be configured to insert a first set of projections 221 into the portals 112 of the particular module 106. After securing the module 106 using the projections 221, the module moving apparatus 200 may remove the module 106 from the compartment 103 of the containerized shipping trailer 100. In some scenarios, the module 106 may need to be placed in a compartment 103 already housing another module 106. The module moving apparatus 200 may use a second set of projections 221 to access the module 106 currently residing in the desired compartment 103. As a result, the module moving apparatus 200 is able to hold or otherwise secure a plurality of modules 106 at a given time. Once the compartment 103 is available (e.g., the compartment 103 is no longer housing another module 106), the appropriate module 106 may be inserted into the designated compartment 103 of the containerized shipping trailer 100.

In the non-limiting example of FIG. 4, the module moving apparatus 200 is shown as having a vertical support rail 224 used to retrieve and/or insert modules 106 into a compartment 103 at varying heights. The vertical support rail 224 may be coupled to one or more projections 221, and/or any other suitable components, that may be moved to adjust a vertical height of the projections 221, for example, to engage modules 106 located at various heights. As a result, the module moving apparatus 200 is able to move vertically to cope with trailers of different heights as well as extracting modules 106 from compartments 103 at different layers or rows of the containerized shipping trailer 100.

Figure 5:
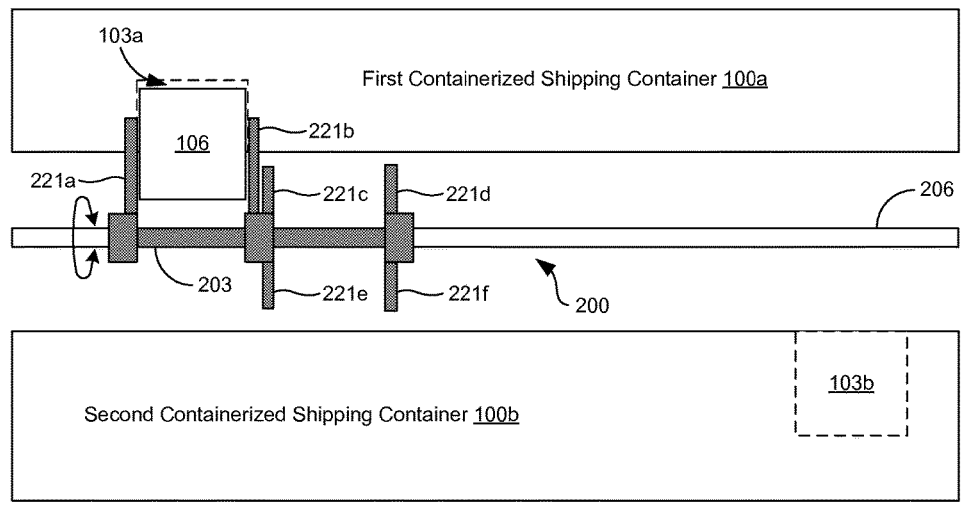
FIG. 5 is a top plan view of the module moving apparatus of FIG. 2 moving a module from a first containerized shipping trailer to a second containerized shipping trailer according to various embodiments of the present disclosure.

Referring next to FIG. 5, shown is a top plan view of the module moving apparatus 200 moving a module 106 from a first compartment 103a in a first containerized shipping trailer 100a to a second compartment 103b in a second containerized shipping trailer 100b. In the non-limiting example of FIG. 5, the module moving apparatus 200 comprises a plurality of projections 221a . . . 221f that are used to grip sides of the module 106 for transport. In alternative embodiments, the projections 221a . . . 221f may comprise forks for insertion into one or more portals 112 of the module 106. In various embodiments, the module moving apparatus 200 may be employed without a structure 218 (FIG. 2) to allow for crossdock operations at various locations, e.g., flexible, temporary and/or on-demand crossdock operations. For example, the module moving apparatus 200 may be placed in a parking lot of an existing facility away from the existing dock doors to avoid additional construction costs. Further, this allows for the placement of module moving apparatus 200 in locations where distribution centers are not be feasible.

The module moving apparatus 200 may move to an appropriate position on the rail 206 to retrieve the module 106 from the first compartment 103a of the first containerized shipping trailer 100a. Once retrieved, the module moving apparatus 200 may rotate about an axis of the rail 206 from a first orientation (e.g., facing the first containerized shipping trailer 100a) to a second orientation (e.g., facing a second containerized shipping trailer 100b) to position the module 106 on the side of the second containerized shipping trailer 100b. The module 106 may be moved by the module moving apparatus 200 to an appropriate position on the rail 206 to insert the module 106 into the second compartment 103b of the second containerized shipping trailer 100b. Alternatively, instead of rotating the module 106, the module moving apparatus 200 may be configured to retrieve the module 106 from the first compartment 103a of the first containerized shipping trailer 100a and slide or otherwise linearly move the module 106 to another side of the module moving apparatus 200 closer to the second containerized shipping trailer 100b to insert the module into the second compartment 103b.

Figure 6:
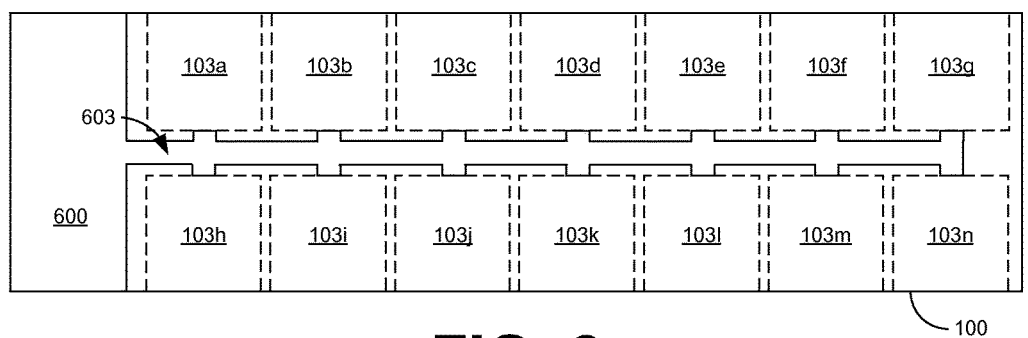
FIG. 6 is a top plan view of the containerized shipping trailer of FIG. 1 comprising a refrigeration unit according to various embodiments of the present disclosure.

Referring next to FIG. 6, shown is a top plan view of an embodiment of a containerized shipping trailer 100 according to various embodiments of the present disclosure. In the non-limiting example of FIG. 6, the containerized shipping trailer 100 comprises a refrigeration unit 600 that is configured to refrigerate one or more compartments 103a . . . 103n and/or the modules 106 (FIG. 1) housed within the compartments 103a . . . 103n. To this end, the containerized shipping trailer 100 may comprise a refrigeration line 603 that delivers cool air to compartments 103a . . . 103n within the containerized shipping trailer 100.

As a non-limiting example, a module 106 may be inserted into at least one of the compartments 103a . . . 103n. The containerized shipping trailer 100 may comprise processing circuitry that recognizes whether the module 106 requires refrigeration. The module 106 may comprise a portal, a vent, or another opening that may couple to an output of the refrigeration line 603. Assuming the module 106 requires refrigeration, refrigeration may be provided to the module 106 by the refrigeration unit 600. If the module 106 does not require refrigeration, a vent, portal, or other opening to the corresponding one of the compartments 103a . . . 103n may be closed such that the module 106 will not be provided with refrigeration.

Although described with respect to refrigeration, other resources may be provided to the compartments 103 and/or modules 106 housed within the compartments 103. In various embodiments, the compartments 103 and/or modules 106 housed within those compartments 103 may be provided with heat, electrical power, networking resources (e.g., wireless fidelity (WiFi)), location-based resources (e.g., global positioning system (GPS)), or other resources. The processing circuitry of the containerized shipping trailer 100 may be configured to detect requested resources by communicating with the module 106. In various embodiments, the module 106 may comprise a passive or active RFID tag comprising identification of the resources requested.

In the non-limiting example of FIG. 6, the compartments 103 are shown extending a portion of a width of the containerized shipping trailer 100. As a result, modules 106 stored in these compartments 103 may only be accessed from one side of the containerized shipping trailer 100. In other embodiments, such as the non-limiting example of FIG. 3, the compartments 103 may extend an entire width of the containerized shipping trailer 100. As a result, the modules 106 stored therein may be accessed from either side of the containerized shipping container 100.

Figure 7:
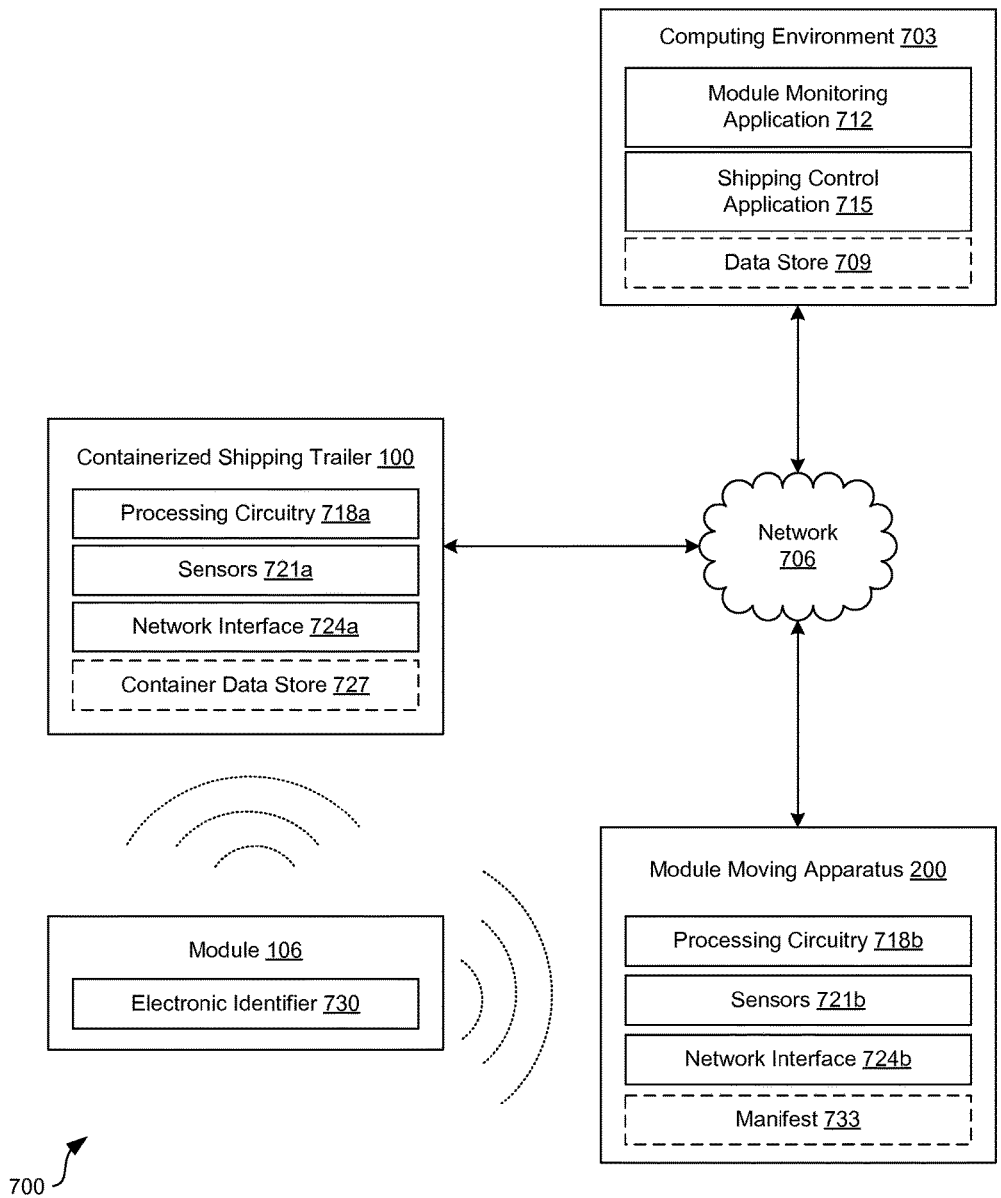
FIG. 7 is a drawing of a networked environment according to various embodiments of the present disclosure.

With reference to FIG. 7, shown is a networked environment 700 according to various embodiments. The networked environment 700 includes a computing environment 703, a containerized shipping trailer 100, a module moving apparatus 200, and/or a module 106, which are in data communication with each other via a network 706. The network 706 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 703 may comprise, for example, a server computer or any other system providing computing capability. Alternatively, the computing environment 703 may employ a plurality of computing devices that may be arranged, for example, in one or more server banks or computer banks or other arrangements. Such computing devices may be located in a single installation or may be distributed among many different geographical locations. For example, the computing environment 703 may include a plurality of computing devices that together may comprise a hosted computing resource, a grid computing resource and/or any other distributed computing arrangement. In some cases, the computing environment 703 may correspond to an elastic computing resource where the allotted capacity of processing, network, storage, or other computing-related resources may vary over time.

Various applications and/or other functionality may be executed in the computing environment 703 according to various embodiments. Also, various data is stored in a data store 709 that is accessible to the computing environment 703. The data store 709 may be representative of a plurality of data stores 709 as can be appreciated. The data stored in the data store 709, for example, is associated with the operation of the various applications and/or functional entities described below.

The components executed on the computing environment 703, for example, include a module monitoring application 712, a shipping control application 715, and other applications, services, processes, systems, engines, or functionality not discussed in detail herein. The module monitoring application 712 is executed to maintain a database or other listing of data associated with modules 106 in the data store 709. The data associated with the modules 106 may include, for example, the items or inventory within the module 106, required resources for the module, a current location of the module 106, a destination location, an originating location, a unique identifier, handling information, compartment information, and/or other information.

The shipping control application 715 is executed to generate manifests for the module moving apparatus 200. A manifest may comprise directions for the module moving apparatus 200 to perform in association with one or more containerized shipping trailers 100. For example, the manifest may comprise directions regarding which modules 106 are to be placed into or removed from a particular compartment 103 of a containerized shipping trailer 100. In other words, the manifest may include instructions that can be performed automatically by the module moving apparatus 200 to automatically perform a retrieval of a specified module 106 from a first location as well as a placement of the specified module 106 at a second location. To this end, the manifest may be generated automatically based on orders. In other embodiments, the manifest may be generated manually by an administrator.

In various embodiments, the containerized shipping trailer 100 may comprise processing circuitry 718a, sensors 721a, network interfaces 724a, and/or a container data store 727. The processing circuitry 718a may comprise, for example, a hardware processor, a microcontroller, one or more integrated circuits, and/or other components. The sensors 721a may comprise, for example, an RFID reader or other sensors that may detect the presence of a module 106 in a respective compartment 103. For example, the sensors 721a may be configured to detect an electronic identifier 730 (e.g., an RFID tag) associated with a module 106.

The electronic identifiers 730 may be used for security, tracking, refrigeration, and/or accessing other resources. To this end, in various embodiments, the electronic identifiers 730 may comprise a passive or active RFID tag, a WiFi beacon, and/or electronically stored information. The electronically stored information may comprise a listing of the items or inventory within the module 106, required resources for the module, whether a lock of a module 106 has been opened or otherwise engaged, whether the module 106 has been opened, a list of those who have opened or accessed the module 106, a current location of the module 106, a destination location, an originating location, a unique identifier, a cargo manifest, handling information, compartment information, and/or other information. As a non-limiting example, the contents of the module 106 may not be accessed without authenticating proper credentials (e.g., personal identification (PIN) numbers) designated by the electronic identifier 730. Similarly, the electronic identifier 730 may set forth resources required or requested by the module 106. For example, the electronic identifier 730 may be used to notify the containerized shipping trailer 100 that the module 106 requires refrigeration to refrigerate perishable items in the module 106. Further, the electronic identifier 730 may comprise a digital manifest to cross-check loading or unloading operations. As may be appreciated, in some scenarios, the digital manifest may be used for customs or regulatory compliance. In various embodiments, the module 106 may comprise other digital security mechanisms (as well as a physical lock) to prohibit access to or moving of the modules 106 into or from a containerized shipping trailer 100 and/or accessing the contents of the modules 106. The digital manifest may comprise a key used to decrypt information stored on the module 106 and/or the containerized shipping trailer 100. In various embodiments, the key may be used to electronically lock or unlock a module 106.

The network interface 724a may comprise, for example, a global system for mobile communication (GSM) module, a code division multiple access (CDMA) module, a WiFi module, or another network interface. In various embodiments, the network interface 724a enables the modules 106 and/or the containerized shipping trailer 100 to communicate information to the computing environment 703. The processing circuitry 718a may be configured to maintain a log of information associated with modules 106 housed within the containerized shipping trailer 100, for example, in the container data store 727.

In various embodiments, the module moving apparatus 200 may comprise processing circuitry 718b, sensors 721b, and/or network interfaces 724b. The processing circuitry 718b may comprise, for example, a hardware processor, a microcontroller, one or more integrated circuits, and/or other components. The sensors 721b may comprise, for example, an RFID reader or other sensors that may detect the presence of a module 106 in a respective compartment 103. For example, the module moving apparatus 200 may confirm an identity of a module 106 before removing a module 106 from or inserting a module 106 into a compartment 103. The network interface 724b may comprise, for example, a GSM module, a CDMA module, a WiFi module, or another network interface. In various embodiments, the network interface 724b enables the modules 106 and/or the containerized shipping trailer 100 to communicate information to the computing environment 703. The processing circuitry 718b may be configured to cause the module moving apparatus 200 to perform a retrieval and/or insertion of modules 106 according to a manifest 733 generated by the shipping control application 715.

Next, a general description of the operation of the various components of the networked environment 700 is provided. To begin, the shipping control application 715 is executed to generate a manifest 733 for a module moving apparatus 200 that directs a retrieval and/or insertion of one or more modules 106 into one or more containerized shipping trailers 100. For example, the manifest 733 may direct the module moving apparatus 200 to retrieve a module 106 from a compartment 103 of a first containerized shipping trailer 100 and place the module 106 in a compartment 103 of a second containerized shipping trailer 100.

Upon retrieval of the module 106, the module moving apparatus 200 may confirm the identity of the module 106 by using a sensor 721b to read the electronic identifier 730. Once the identity is confirmed, the module moving apparatus 200 may move the module 106 as designated by the manifest 733. As a module 106 is placed in a containerized shipping trailer 100, the containerized shipping trailer 100 may use sensors 721a to detect any requested or required resources set forth in the electronic identifier 730. For example, in some embodiments, the module 106 may require refrigeration. The processing circuitry 718a may cause a refrigeration unit 600 (FIG. 6) to provide the module 106 with refrigeration. Similarly, other resources may be provided to the module 106. In various embodiments, the module 106 may be provided with heat, electrical power, networking resources (e.g., wireless fidelity (WiFi)), location-based resources (e.g., global positioning system (GPS)), or other resources, as set forth in the electronic identifier 730.

Figure 8:
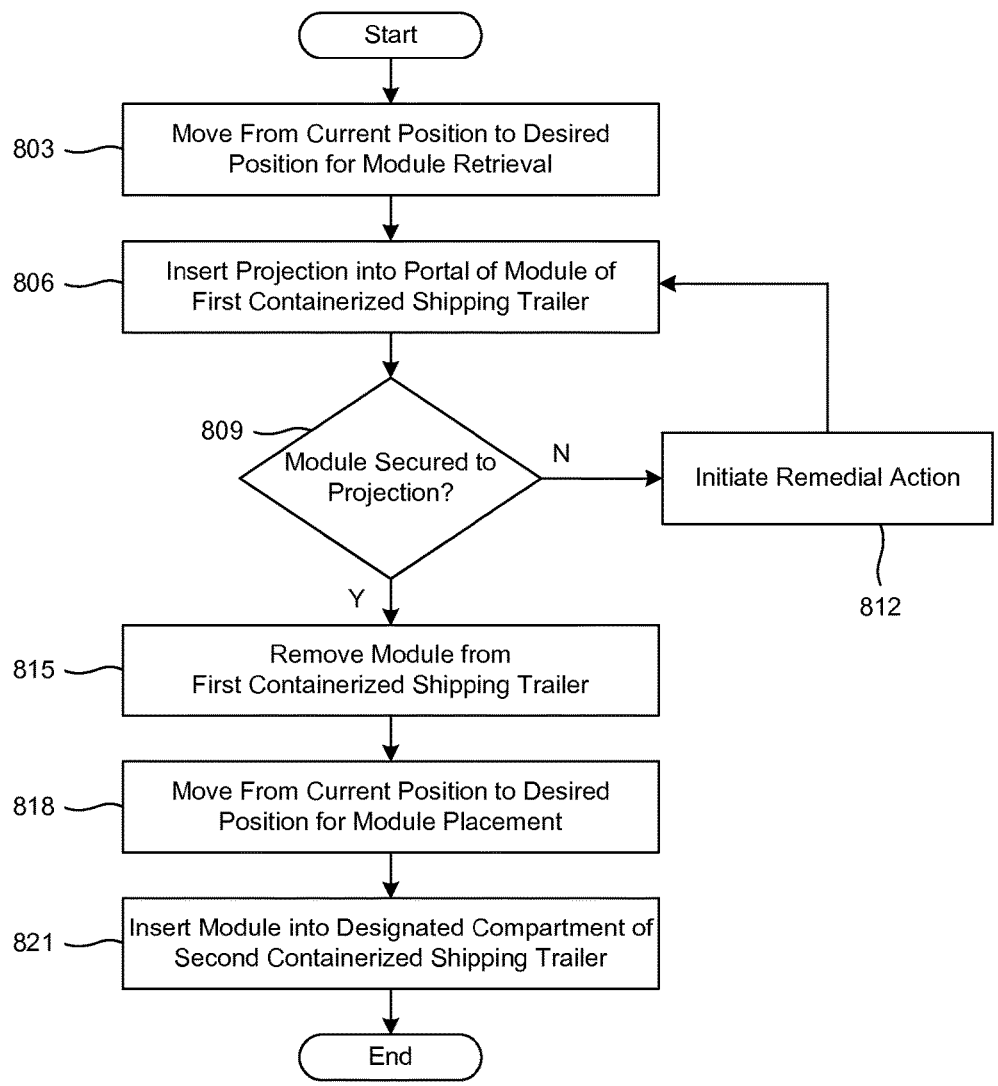
FIG. 8 is a flowchart illustrating one example of functionality implemented by the module moving apparatus of FIG. 2 according to various embodiments of the present disclosure.

Referring next to FIG. 8, shown is a flowchart that provides one example of the operation of the module moving apparatus 200 according to various embodiments. It is understood that the flowchart of FIG. 8 provides merely an example of the many different types of functional arrangements that may be employed to implement the operation of the module moving apparatus 200 as described herein. As an alternative, the flowchart of FIG. 8 may be viewed as depicting an example of elements of a method implemented by the processing circuitry 718b (FIG. 7) of the module moving apparatus 200 according to one or more embodiments.

Beginning with 803, the module moving apparatus 200 may move from a current position to a desired position for retrieval of a module 106. In various embodiments, the retrieval of the module 106 may be directed by a manifest 733 (FIG. 7) generated by the shipping control application 715 (FIG. 7) and communicated to the module moving apparatus 200 over the network 706 (FIG. 7) via network interface 724b. Using pneumatics, hydraulics, electrical motors, combustion engines, and/or other suitable mechanisms, the processing circuitry 718b may direct the movement of the body 203 (FIG. 2) of the module moving apparatus 200 to an appropriate position along the rail 206 (FIG. 2).

In various embodiments, the position of the body 203 of the module moving apparatus 200 on the rail 206 may be determined by capturing digital images of distance markers or other fiducials on the rail 206 indicative of a position of the body 203 on the rail 206. In other embodiments, the module moving apparatus 200 may employ laser or sonar distance measurement that sends a visual or audio pulse, respectively, towards a predefined target and measures the time taken by the pulse to be reflected off the target and returned. In some embodiments, the module moving apparatus 200 may calculate a position of the body 203 of the module moving apparatus 200 by using a number of rotations of a motor, or appropriate actuation of an actuator, used to move the body 203 of the module moving apparatus 200.

In various embodiments, an identity of the module 106 at the position of the module moving apparatus 200 may be confirmed prior to retrieval of the module 106. In various embodiments, the module moving apparatus 200 may interrogate a sensor (e.g., an RFID tag) associated with the module 106 and/or the containerized shipping trailer 100 to compare a unique identifier associated with the module 106 to a unique identifier in a digital manifest. In other words, the module 106 is interrogated to verify that the module 106 is a correct module for retrieval or placement based on the manifest 733 and data received from the module 106 using a sensor 721b of the module moving apparatus. Further, the unique identifier, as well as any other electronically stored information onboard the module 106, may be encrypted to prevent unauthorized access to the electronically stored information. In various embodiments, the module moving apparatus 200 may be configured to decrypt the information to confirm the identity of the module 106 prior to retrieval.

Next, in 806, the module moving apparatus 200 may perform a retrieval of the module 106 by inserting one or more projections 221 (FIG. 1) into one or more portals 112 (FIG. 1) of the module 106. In other embodiments, the projections 221 may comprise grippers used to move a module 106 by applying pressure to at least two sides of the module 106. As a result, the module 106 may be gripped, lifted, moved, removed, rotated, and/or inserted into compartments 103 or other locations, such as inventory locations in the structure 218 (FIG. 2).

In 809, it is determined whether the module 106 to be retrieved is secured to the projections 221 to avoid potential damage of the module 106 or items within the module 106. In various embodiments, a weight sensor may be used to determine whether a substantial amount of weight of the module 106 has been applied to the module 106 that may indicate that the module 106 is properly residing on the projections 221. If the module 106 is not secured to the projections, the process may proceed to 812 where a remedial action may be performed, such as triggering an alarm, repositioning the body 203 of the module moving apparatus 200, re-inserting the module 106 in the compartment 103, re-inserting the projections 221 into the portals 112, or any other appropriate action.

Assuming the module is properly secured to the projections 221, the process proceeds to 815 where the module is fully removed from the first containerized shipping trailer 100. Removal may include pulling an entirety of the module 106 from an interior of the first containerized shipping trailer 100.

Next, in 818, the module moving apparatus 200 moves from its current position on the rail 206 to a desired position on the rail 206 for placement of the module 106 in a suitable location, such as the interior 215 (FIG. 2) of a structure 218 or in a compartment 103 of a second containerized shipping trailer 100. In 821, the module moving apparatus 200 may insert the module 106, for example, into a designated compartment 103 of the second containerized shipping trailer 100.

Figure 9:
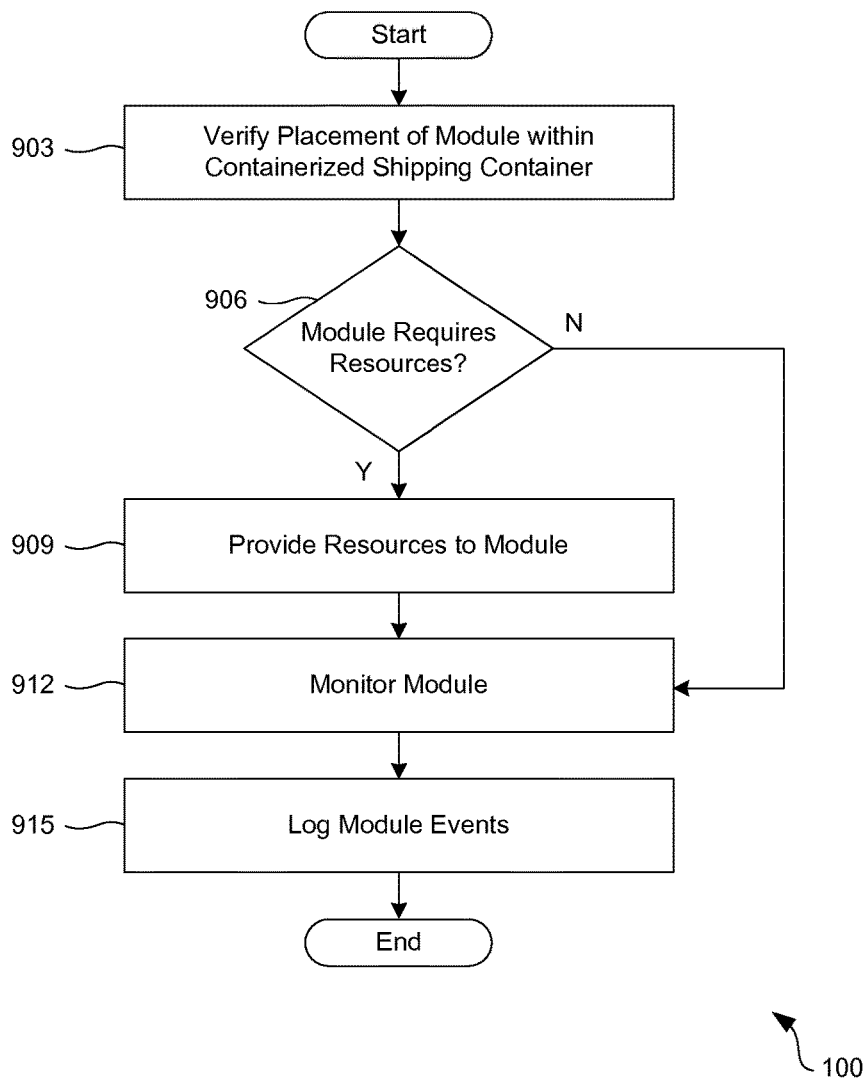
FIG. 9 is a flowchart illustrating one example of functionality implemented by the containerized shipping trailer of FIG. 1 according to various embodiments of the present disclosure.

Moving on to FIG. 9, shown is a flowchart that provides one example of the operation of the containerized shipping trailer 100 according to various embodiments. It is understood that the flowchart of FIG. 9 provides merely an example of the many different types of functional arrangements that may be employed to implement the operation of the containerized shipping trailer 100 as described herein. As an alternative, the flowchart of FIG. 9 may be viewed as depicting an example of elements of a method implemented by the processing circuitry 718a (FIG. 7) of the containerized shipping trailer 100 according to one or more embodiments.

Beginning with 903, the placement of a module 106 (FIG. 1) within the containerized shipping trailer 100 is verified. To this end, one or more sensors 721a (FIG. 7) of the containerized shipping trailer 100 may be employed to determine whether the module 106 has been placed in the containerized shipping trailer 100. For example, an RFID reader may be used to read an electronic identifier 730 (FIG. 7) (e.g., an RFID tag) of the module 106. In other embodiments, a weight sensor, an image recognition device, sonar, or any other suitable device may be used to determine whether the module 106 has been placed within the containerized shipping trailer 100.

Next, in 906, it is determined whether the module 106 requires one or more resources provided by the containerized shipping trailer 100. As noted above, in some embodiments, the containerized shipping trailer 100 may comprise a refrigeration unit 600 (FIG. 6) configured to refrigerate one or more of the modules 106 within the containerized shipping trailer 100. The containerized shipping trailer 100 may read data from the electronic identifier 730 to determine whether the module 106 requires refrigeration. Assuming the module 106 requires refrigeration, refrigeration may be provided to the module 106 by the refrigeration unit 600. If the module 106 does not require refrigeration, a vent, portal, or other opening to the corresponding one of the compartments 103a . . . 103n may be closed such that the module 106 will not be provided with refrigeration.

Accordingly, in 909, if the module requires (or requests) resources from the containerized shipping trailer 100, the containerized shipping trailer 100 may provide the required resources to the module 106. Although described with respect to refrigeration, other resources may be provided to the compartments 103 and/or modules 106 housed within the compartments 103. In various embodiments, the compartments 103 and/or modules 106 housed within those compartments 103 may be provided with heat, electrical power, networking resources (e.g., wireless fidelity (WiFi)), location-based resources (e.g., global positioning system (GPS)), or other resources. The processing circuitry of the containerized shipping trailer 100 may be configured to detect requested resources by communicating with the module 106. In various embodiments, the module 106 may comprise a passive or active RFID tag comprising identification of the resources requested.

Assuming the module 106 does not require resources, the process may proceed to 912 where the module 106 may be monitored. In various embodiments, monitoring of the module 106 may include periodically measuring a temperature of the module 106, accessing data communicated from the module 106 to the containerized shipping trailer 100, determining whether the module 106 has been removed from the containerized shipping trailer 100, etc. In 915, any events and/or measurements taken during a monitoring of the module 106 may be logged, e.g., in the container data store 727, for transmission to the computing environment 703 (FIG. 7) over the network 706 (FIG. 7) via network interface 724a.

Figure 10:
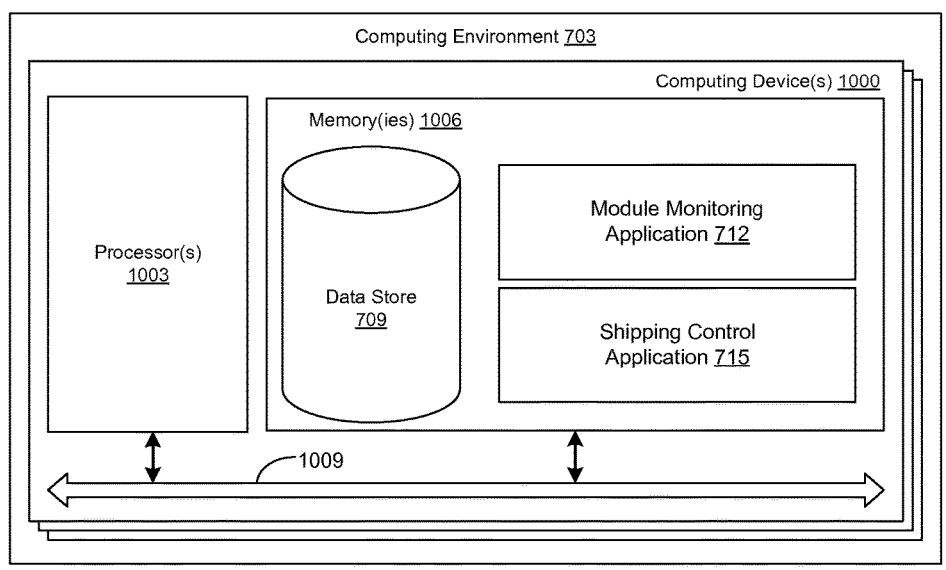
FIG. 10 is a schematic block diagram that provides one example illustration of a computing environment employed in the networked environment of FIG. 7 according to various embodiments of the present disclosure.

With reference to FIG. 10, shown is a schematic block diagram of the computing environment 703 according to an embodiment of the present disclosure. The computing environment 703 includes one or more computing devices 1000. Each computing device 1000 includes at least one processor circuit, for example, having a processor 1003 and a memory 1006, both of which are coupled to a local interface 1009. To this end, each computing device 1000 may comprise, for example, at least one server computer or like device. The local interface 1009 may comprise, for example, a data bus with an accompanying address/control bus or other bus structure as can be appreciated.

Stored in the memory 1006 are both data and several components that are executable by the processor 1003. In particular, stored in the memory 1006 and executable by the processor 1003 are the module monitoring application 712, the shipping control application 715, and potentially other applications. Also stored in the memory 1006 may be a data store 709 and other data. In addition, an operating system may be stored in the memory 1006 and executable by the processor 1003.

It is understood that there may be other applications that are stored in the memory 1006 and are executable by the processor 1003 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 1006 and are executable by the processor 1003. In this respect, the term "executable" means a program file that is in a form that can ultimately be run by the processor 1003. Examples of executable programs may be, for example, a compiled program that can be translated into machine code in a format that can be loaded into a random access portion of the memory 1006 and run by the processor 1003, source code that may be expressed in proper format such as object code that is capable of being loaded into a random access portion of the memory 1006 and executed by the processor 1003, or source code that may be interpreted by another executable program to generate instructions in a random access portion of the memory 1006 to be executed by the processor 1003, etc. An executable program may be stored in any portion or component of the memory 1006 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1006 is defined herein as including both volatile and nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1003 may represent multiple processors 1003 and/or multiple processor cores and the memory 1006 may represent multiple memories 1006 that operate in parallel processing circuits, respectively. In such a case, the local interface 1009 may be an appropriate network that facilitates communication between any two of the multiple processors 1003, between any processor 1003 and any of the memories 1006, or between any two of the memories 1006, etc. The local interface 1009 may comprise additional systems designed to coordinate this communication, including, for example, performing load balancing. The processor 1003 may be of electrical or of some other available construction.

Although the module monitoring application 712, the shipping control application 715, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 8 and 9 show the functionality and operation of an implementation of the module moving apparatus 200 (FIG. 2) and the containerized shipping trailer 100 (FIG. 1), respectively. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1003 in a computer system or other system. The machine code may be converted from the source code, etc. If embodied in hardware, each block may represent a circuit or a number of interconnected circuits to implement the specified logical function(s).

Although the flowcharts of FIGS. 8 and 9 show a specific order of execution, it is understood that the order of execution may differ from that which is depicted. For example, the order of execution of two or more blocks may be scrambled relative to the order shown. Also, two or more blocks shown in succession in FIGS. 8 and 9 may be executed concurrently or with partial concurrence. Further, in some embodiments, one or more of the blocks shown in FIGS. 8 and 9 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the module monitoring application 712 and the shipping control application 715, that comprises software or code can be embodied in any non-transitory computer-readable medium for use by or in connection with an instruction execution system such as, for example, a processor 1003 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the module monitoring application 712 and the shipping control application 715, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 1000, or in multiple computing devices in the same computing environment 703. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   a shipping container, comprising:
      a first side and a second side;
      a plurality of compartments positioned longitudinally along the shipping container, the plurality of compartments being defined by a plurality of openings between the first side and the second side of the shipping container;
      a plurality of modules positioned in the plurality of compartments, individual ones of the plurality of compartments being configured to receive the plurality of modules at an interior of the shipping container such that a first side of the plurality of modules is exposed on the first side of the shipping container during transport, and a second side of the plurality of modules is exposed on the second side of the shipping container during transport;
      a sensor;
      processing circuitry coupled to the sensor comprising at least one hardware processor that, through execution of program instructions, is configured to:
         detect a placement of one of the plurality of modules in one of the plurality of compartment using the sensor;
         in response to the placement of the one of the plurality of modules in the one of the plurality of compartments, determine that the one of the plurality of modules requires a resource based at least in part on data corresponding to the one of the plurality of modules; and
         provide the resource to the one of the plurality of modules;
      wherein individual ones of the plurality of modules are independently insertable into or removable from a corresponding one of the plurality of compartments of the shipping container, and
      wherein the first side and the second side of the individual ones of the plurality of modules comprise at least one portal configured to receive at least one projection to insert or remove a corresponding one of the plurality of modules into or from a corresponding one of the plurality of compartments from either the first side or the second side of the shipping container.

2. The system of claim 1, wherein the at least one projection further comprises a fork of a forklift, or a fork of a module moving apparatus.

3. The system of claim 1, wherein the individual ones of the plurality of modules comprise a lock and a device having memory with electronically stored information thereon comprising whether the lock has been engaged.

4. The system of claim 1, further comprising a refrigeration unit configured to provide cool air to at least a portion of the plurality of modules.

5. The system of claim 1, wherein the processing circuitry is further configured to:
   identify the resource required by the one of the plurality of modules from an electronic identifier of the one of the plurality of modules using the sensor; and
   provide the at least one resource to the one of the plurality of modules in response to the electronic identifier being identified.

6. The system of claim 5, wherein the resource is at least one of refrigeration, heat, electrical power, networking resources, or location-based resources.

7. The system of claim 1, wherein:
the individual ones of the plurality of modules comprise a tag having a unique identifier stored thereon interpretable by the sensor;
the shipping container further comprises a memory device having a digital manifest stored thereon; and
the processing circuitry is further configured to interrogate the sensor to verify a placement of the one of the plurality of modules in the one of the plurality of compartments of the shipping container in accordance with the digital manifest by comparing the unique identifier obtained from the sensor to the digital manifest.

8. The system of claim 7, wherein the tag comprises a radio-frequency identification (RFID) tag.

9. The system of claim 1, wherein the shipping container is detachably attached to a trailer or a rail car comprising a plurality of wheels.

* * * * *